United States Patent
Sakurada et al.

(10) Patent No.: US 6,497,611 B2
(45) Date of Patent: Dec. 24, 2002

(54) METHOD OF POLISHING A MAGNETIC HEAD SLIDER

(75) Inventors: Toshimichi Sakurada, Tokyo (JP); Yasutoshi Fujita, Tokyo (JP); Masao Yamaguchi, Tokyo (JP); Kazuo Orii, Tokyo (JP); Isao Saito, Tokyo (JP)

(73) Assignee: TDK Corporation, Tokyo (JP)

( * ) Notice: Subject to any disclaimer, the term of this patent is extended or adjusted under 35 U.S.C. 154(b) by 40 days.

(21) Appl. No.: 09/767,881

(22) Filed: Jan. 24, 2001

(65) Prior Publication Data

US 2002/0031979 A1 Mar. 14, 2002

(30) Foreign Application Priority Data

Jan. 28, 2000 (JP) .......................... 2000-024804

(51) Int. Cl.$^7$ .............................................. B24B 49/00
(52) U.S. Cl. ............................................. 451/5; 451/57
(58) Field of Search ........................... 451/5, 9, 10, 41, 451/57, 14, 272; 29/603.12, 603.15, 603.16

(56) References Cited

U.S. PATENT DOCUMENTS

| | | | |
|---|---|---|---|
| 5,749,769 A | * | 5/1998 | Church et al. ............. 451/5 |
| 5,902,172 A | | 5/1999 | Utashiro |
| 5,913,715 A | * | 6/1999 | Kirchner et al. ........... 451/56 |
| 5,957,757 A | * | 9/1999 | Berman ..................... 451/56 |
| 6,299,507 B1 | * | 10/2001 | Katoh et al. ............... 451/9 |

FOREIGN PATENT DOCUMENTS

| | | |
|---|---|---|
| JP | 05-84657 | 4/1993 |
| JP | 07-132456 | 5/1995 |
| JP | 09-180389 | 7/1997 |
| JP | 09-245333 | 9/1997 |
| JP | 10-134316 | 5/1998 |

* cited by examiner

*Primary Examiner*—George Nguyen
*Assistant Examiner*—Dung Van Nguyen
(74) *Attorney, Agent, or Firm*—Oliff & Berridge, PLC (57) ABSTRACT

Disclosed is a method of polishing a magnetic head slider whereby a by-processed step can be easily reduced. An air bearing surface of the magnetic head slider is polished with setting a bar that includes the magnetic head slider where a thin film magnetic head element is formed to reciprocate in a radius direction of a polishing plate, as well as rotating the polishing plate having a polishing surface. Polishing steps include a first polishing step of performing a height polish while rotating the polishing plate at a first velocity, and a second polishing step of performing a finishing polish while rotating the polishing plate at a second velocity sufficiently lower than the first velocity. The second velocity at the second polishing step is set so that an average linear velocity in the direction of the rotation of the polishing plate is equal to or lower than 0.032 m/s (preferably equal to or lower than 0.008 m/s). Consequently, the by-processed step that is generated on the air bearing surface of the magnetic head slider is reduced.

16 Claims, 8 Drawing Sheets

FIG.7 height — polishing process

FIG.8 finishing — polish process

METHOD OF POLISHING A MAGNETIC HEAD SLIDER

BACKGROUND OF THE INVENTION

1. Field of the Invention

The present invention relates to a method of polishing a magnetic head slider including a thin film magnetic head element that performs recordation or reproduction of information on a recording medium such as a hard disk.

2. Description of the Related Art

In a magnetic recording apparatus such as a hard disk drive, a thin film magnetic head element that performs writing or reading of magnetic information is equipped in a magnetic head slider, which is provided opposing a recording surface of a recording medium such as a hard disk.

The magnetic head slider is hexahedral in shape and a couple of parallel slider rails is formed on one surface thereof. The surface of the slider rail is a surface opposing to the recording surface of the recording medium, which is called an air bearing surface (ABS) (or an airborne surface). A flow of air occurred between the recording surface and the air bearing surface by rotation of the recording medium makes the magnetic head slider slightly apart (popularly speaking, airborne) from the recording medium. The thin film magnetic head element is formed on the surface, which is hereinafter referred to as an element-formed surface, perpendicular to the air bearing surface.

As a method of forming the air bearing surface by polishing, Japanese Unexamined Patent Publication No. 132456/1995 discloses a method by which a disk-shaped board is rotated and an object to be polished is rocked along a diametral direction of the board, to polish the object to be polished. By this method, it is said that generation of scratches by polishing can be prevented by polishing the object to be polished under the condition that an average speed in the board-rotating direction is lower than a speed in the rocking direction in the latter half of the polishing process.

Generally, the thin film magnetic head element is formed on a predetermined substrate, having a multilayered structure including various kinds of insulating layers, magnetic layers and the like. But the substrate and the element structural materials are different in hardness of materials. Consequently, it is known that performing a polish on a element-multilayered end face, which is parallel to a direction of stacking of thin films, of the magnetic head slider in order to form the air bearing surface causes a by-processed step on the polished surface. More specifically, because the element structural materials are softer than the substrate, a portion of the element-multilayered end face on the air bearing surface becomes recessed, in other words, lower than a portion of the substrate section. As a result, when the magnetic head slider is actually equipped in the hard disk drive, a distance between the multilayered section portion of the thin film magnetic head element and the surface of the disk cannot be sufficiently shortened, and it is difficult to improve a strength of a signal magnetic field for recording and reproducing.

In the above polishing method, the by-processed step on the air bearing surface is not considered in the least, and it is conceivable that the by-processed step on the air bearing surface cannot be reduced.

On the other hand, some polishing methods are proposed with the aim of reducing such a by-processed step.

For example, Japanese Unexamined Patent Publication No. 134316/1998 and Japanese Unexamined Patent Publication No. 245333/1997 disclose a method of polishing a magnetic head, in which method a pretreatment to embed abrasive in the board is performed according to a predetermined procedure with correcting ring and dummy work, and the board performed with the pretreatment is rotated, with a solution including no abrasive dropped down on the board.

Japanese Unexamined Patent Publication No. 180389/1997 discloses a method of polishing an airborne surface (air bearing surface) of a magnetic head slider with a lap which is equipped with a main body of the lap in plate shape and abrasive particles fixed on the surface of the main body of the lap. The abrasive is embedded, of which a part is exposed.

Japanese Unexamined Patent Publication No. 84657/1993 discloses a method of polishing an airborne surface of a magnetic head with a lap and a mixed solution of an anion surface-active agent and an amphoteric surface-active agent. The lap is made of a material that combines a phase of tin with a phase of brass possessing greater stiffness for supporting abrasive than tin.

However, in each of the above technologies the rotation speed of the polishing plate is not taken into consideration, although reduction of a by-processed step is intended in common.

SUMMARY OF THE INVENTION

The invention has been achieved in light of the foregoing problems and its object is to provide a method of polishing a magnetic head slider, by which the height of a by-processed step on an element-multilayered end face (a surface to be polished) of the magnetic head slider is easily reduced and thereby a polish with high accuracy is enabled.

A method of polishing the magnetic head slider according to the first aspect of the invention is a method of polishing a magnetic head slider, whereby an element-multilayered end face of the magnetic head slider where a thin film magnetic head element is formed as a multilayered structure is polished with a polishing plate having a polishing surface, including: a first polishing step of polishing the element-multilayered end face of the magnetic head slider by means of setting the polishing plate to rotate at a first velocity; and a second polishing step of performing a finishing polish of the element-multilayered end face of the magnetic head slider processed in the first polishing step by means of setting the polishing plate to rotate at a second velocity lower than the first velocity, wherein the second velocity is set so that an average linear velocity in a direction of the rotation of the polishing plate is equal to or lower than 0.032 meters per second in the second polishing step. In the second polishing step, the magnetic head slider may be set to reciprocate along a direction almost orthogonal to the direction of the rotation of the polishing plate.

In the method of polishing the magnetic head slider according to the first aspect of the invention, the first polishing step is performed by means of the polishing plate rotating at the first velocity, and the second polishing step is performed by means of the polishing plate rotating at the second velocity lower than the first velocity. The second velocity is set so that the average linear velocity in the direction of the rotation of the polishing plate is equal to or lower than 0.032 meters per second.

In a method of polishing a magnetic head slider according to the second aspect of the invention, is the element-multilayerd end face of the magnetic head slider where the thin film magnetic head element is formed as a multilayered structure is polished with the polishing plate having the polishing surface, including the first polishing step of polishing the element-multilayered end face of the magnetic head slider by means of setting the polishing plate to rotate at the first velocity; and the second polishing step of performing the finishing polish of the element-multilayered end face of the magnetic head slider processed in the first polishing step by means of setting the magnetic head slider to reciprocate along the direction almost orthogonal to the direction of the rotation of the polishing plate in the first polishing step with the polishing plate set to stop.

In the method of polishing the magnetic head slider according to the second aspect of the invention, the first polishing step is performed by means of the polishing plate rotating at the first velocity, and the second polishing step is performed by means of setting the magnetic head slider to reciprocate along the direction almost orthogonal to the direction of the rotation of the polishing plate at the first polishing step with the polishing plate set to stop.

In the method of polishing a magnetic head slider according to the first aspect of the invention, it is preferable that the second velocity is set so that the average linear velocity in the direction of the rotation of the polishing plate is equal to or lower than 0.008 meters per second in the second polishing step.

Furthermore, in the method of polishing the magnetic head slider according to the first or the second aspect of the invention, it is preferable to perform the second polishing step using a polishing liquid that includes no polishing particles. Furthermore, it is preferable to perform the first polishing step using a polishing liquid that includes polishing particles. It is preferable that the first polishing step and the second polishing step are set to be continuously performed with one and the same polishing apparatus.

In a method of polishing a magnetic head slider according to the third aspect of the invention, a cleaning step for removing the impurities generated in the first polishing step is performed before starting the second polishing step. In this polishing method, an effect that the impurities have on the second polishing step is reduced, because almost all the impurities are removed before starting the second polishing step. Here, the impurities include the polishing abrasives used at the first polishing step, polish leavings newly produced at the first polishing step and the other matter.

In the method of polishing a magnetic head slider according to the third aspect of the invention, the impurities may be removed by means of wiping off the impurities on the polishing plate with a predetermined solvent in the cleaning step. Otherwise, the impurities on the polishing plate may be removed using a member for removing the impurities that is provided on the polishing surface of the polishing plate while the polishing plate is rotated with a predetermined solvent being supplied in the cleaning step. It is preferable that the first polishing step, the cleaning step and the second polishing step are continuously performed with one and the same polishing apparatus.

Other and further objects, features and advantages of the invention will appear more fully from the following description.

DETAILED DESCRIPTION OF THE PREFERRED EMBODIMENTS

[Structure of a Magnetic Head Slider]

First, referring to FIGS. 1 to 3, a structure of a magnetic head slider will be described, to which a method of polishing the magnetic head slider according to an embodiment of the present invention is applied.

Figure 1:
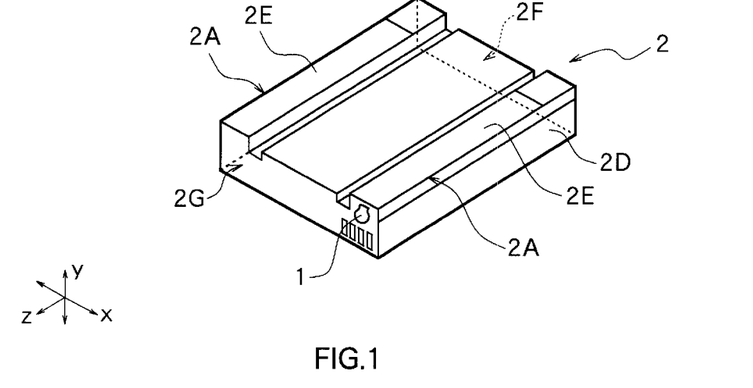
FIG. 1 is a perspective view showing an apparent structure of a magnetic head slider for which a method of polishing a magnetic head slider according to an embodiment of the present invention is employed.

FIG. 1 shows an apparent structure of a magnetic head slider 2 to which the method of polishing the magnetic head slider according to the embodiment is applied. FIG. 2 explodedly shows a structure of a thin film magnetic head element 1. FIG. 3 shows a sectional structure of elements taken along the line III—III in FIG. 2 when viewed in the direction of the arrow. The magnetic head slider 2 is fixed on a tip portion of an actuator arm (not shown) equipped in a hard disk (not shown). The actuator arm rotates, for example, by a driving force of a voice coil motor (not shown). By this rotation, the magnetic head slider 2 transfers in the direction across a track line along with a recording surface of a recording medium (not shown) such as a hard disk.

As shown in FIG. 1, the magnetic head slider 2 is a block in approximately a hexahedral shape, one side of which (upper side in the figure) is disposed so as to adjacently face the recording surface of the recording medium. A couple of parallel slider rails 2A is formed on the side facing the recording surface of the recording medium. A surface of the slider rail 2A is called an air bearing surface (ABS) 2E. When the recording medium rotates, an air flow occurred between the recording surface of the recording medium and the air bearing surface 2E makes the magnetic head slider 2 transfer by very slight amount so as to be apart from the recording surface in the opposing direction Y against the recording surface. Consequently, a regular clearance comes into existence between the air bearing surface 2E and the recording medium. The thin film magnetic head element 1 is provided on an element-forming surface 2G orthogonal to the air bearing surface 2E of the magnetic head slider 2, which is a side end face on the left hand side in FIG. 1.

Figure 2:
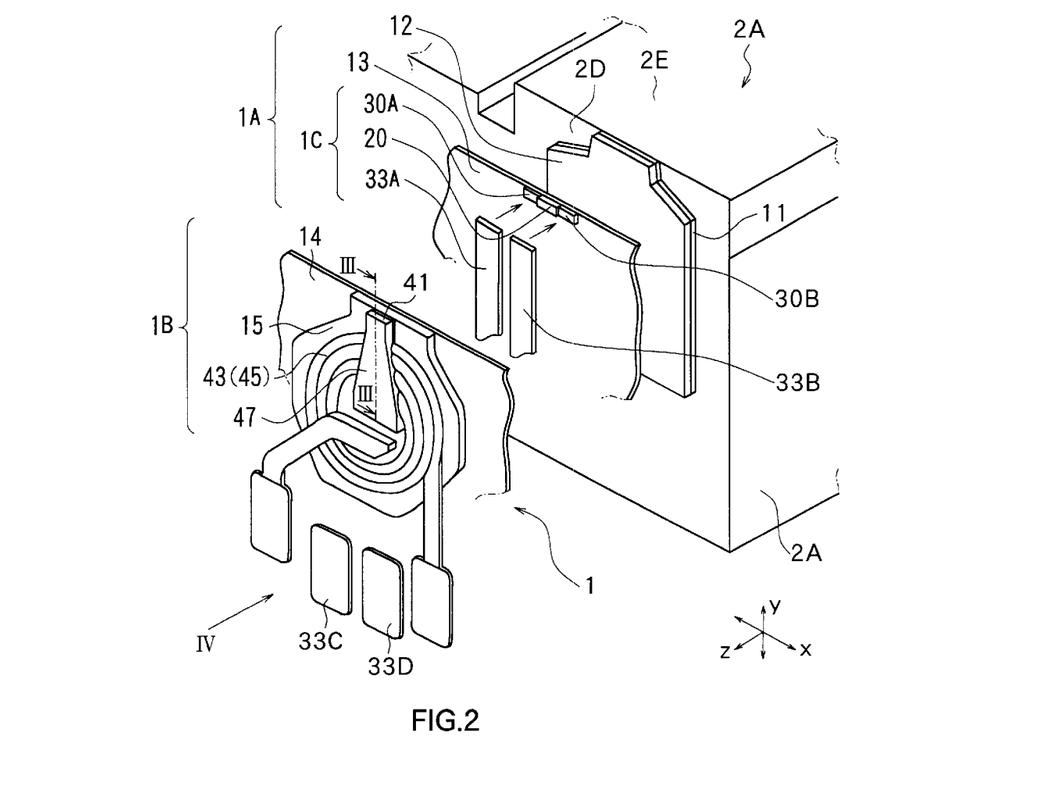
FIG. 2 is an exploded perspective view showing a structure of a thin film magnetic head element in-the magnetic head slider shown in FIG. 1.
Figure 3:
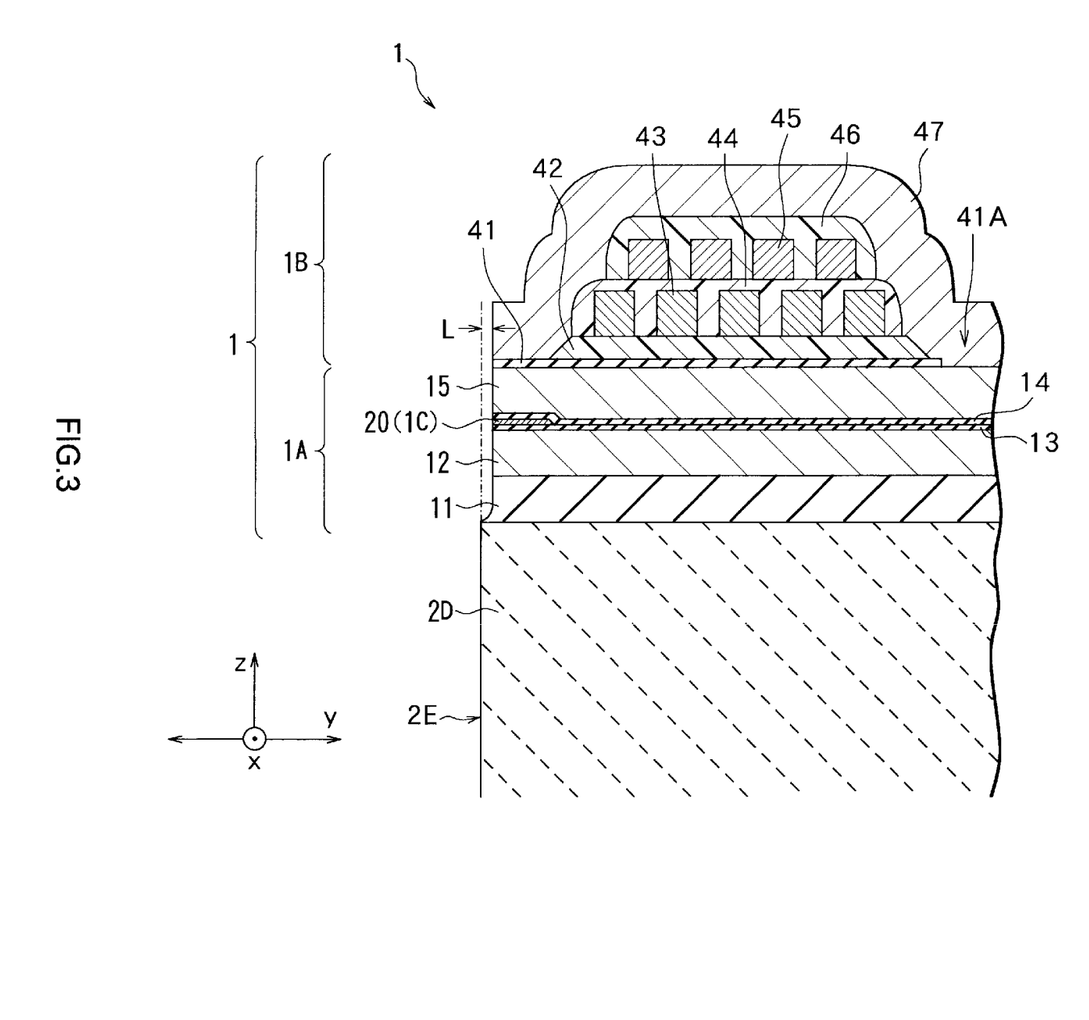
FIG. 3 is a sectional view taken along the line III—III of the thin film magnetic head element in the magnetic head slider shown in FIG. 2 when viewed in the direction of the arrow.

As shown in FIGS. 2 and 3, the thin film magnetic head element 1 includes a reproducing head portion 1A which reproduces magnetic information recorded on the recording medium and a recording head portion 1B which records magnetic information on the recording medium. The reproducing head portion 1A, for example, has a multilayered structure with an insulating layer 11, a bottom shield layer 12, a bottom shield gap layer 13, a top shield gap layer 14, and a top shield layer 15 stacked in this order on a substrate 2D made of a ceramic material or the like in the slider 2. The insulating layer 11 is, for example, 2 $\mu$m to 10 $\mu$m in thickness and composed of $Al_2O_3$ (alumina). The bottom shield layer 12 is, for example, 1 $\mu$m to 3 $\mu$m in thickness and composed of a magnetic material such as NiFe (an alloy of nickel and iron: permalloy). The bottom shield gap layer 13 and the top shield gap layer 14 are, for example, 10 nm to 100 nm in thickness respectively and composed of $Al_2O_3$ or AlN (aluminum nitride) respectively. The top shield layer 15 is, for example, 1 $\mu$m to 4 $\mu$m in thickness and composed of a magnetic material such as NiFe. Furthermore, the top shield layer 15 possesses a function as a bottom pole of the recording head portion 1B at the same time.

An MR (Magneto-Resistive) element 1C is buried between the bottom shield gap layer 13 and the top shield gap layer 14. The MR element 1C is placed on the part close to the air bearing surface 2E for the purpose of reading information which is written on the recording medium. The MR element 1C includes an MR film 20 which is constituted by an AMR (Anisotropic Magneto-Resistive) film and a GMR (Giant Magneto-Rsistive) film. The AMR film has a single-layered structure including a magnetic layer made of NiFe or the like. The GMR film has a multilayered structure including a plurality of layers such as a soft magnetic layer, a ferromagnetic layer made of CoFe (an alloy of cobalt and iron) or the like, an anti-ferromagnetic layer made of MnPt (an alloy of manganese and platinum) or the like, a non-magnetic metal layer made of Cu (copper) and the like.

As shown in FIG. 2, on both sides of the MR film 20 in the direction of a track width (direction X in the figure), magnetic domain controlling films 30A and 30B are formed of a hard magnetic material or the like. The magnetic domain controlling films 30A and 30B are formed for the purpose of suppressing generation of Barkhausen Noise by means of applying a regular directional bias magnetic field to the MR film 20 in a certain direction. A couple of lead layers 33A and 33B, which is disposed facing each other in the direction of the track width with the MR film 20 in between, is electrically connected to the MR film 20 respectively. The lead layers 33A and 33B are made of tantalum (Ta) or the like, and each of them is formed between the bottom shield gap layer 13 and the top shield gap layer 14. The lead layers 33A and 33B are respectively extended toward the side apart from the air bearing surface 2E, so that they are electrically connected to output terminals 33C and 33D formed in a predetermined pattern on the top shield gap layer 14 sandwiching a unshown opening portion which is formed on the top shield gap layer 14.

As shown in FIG. 3, the recording head portion 1B, for example, includes a write gap layer 41 of 0.1 $\mu$m to 0.5 $\mu$m in thickness which is made of an insulating film such as $Al_2O_3$, on the top shield layer 15. The write gap layer 41 includes a opening portion 41A at the position corresponding to the center of thin film coils 43 and 45 which will be described below. On the write gap layer 41, the thin film coil 43 of 1 $\mu$m to 3 $\mu$m in thickness and a photoresist layer 44 which covers the thin film coil 43 are respectively formed sandwiching a photoresist layer 42 of 1.0 $\mu$m to 5.0 $\mu$m in thickness, for example. On the photoresist layer 44, the thin film coil 45 of 1 $\mu$m to 3 $\mu$m in thickness and a photoresist layer 46 which covers the thin film coil 43 are respectively formed.

On the write gap layer 41 and the photoresist layers 42, 44 and 46, a top pole 47 of about 3 $\mu$m in thickness is formed of a magnetic material having a high saturation magnetic flux density such as NiFe or FeN (iron nitride), for example. The top pole 47 is in touch with, and magnetically coupled to the top shield layer 15, through the opening portion 41A of the write gap layer 41 which is provided in a position corresponding to the center of the thin film coils 43 or 45. On the top pole 47, although not shown in FIGS. 2 and 3, an overcoat layer of 20 $\mu$m to 30 $\mu$m in thickness is, for example, formed of $Al_2O_3$ so as to cover the whole. In such a formation, the recording head portion 1B records information. Namely, electric current passing through the thin film coils 43 and 45 generates magnetic flux between the top pole 47 and the top shield layer 15 serving as a bottom pole and the magnetic flux generated in the vicinity of the write gap layer 41 magnetizes the recording medium.

The thin film magnetic head element 1 of such a structure acts as follows. Specifically, the magnetic flux for writing is generated by feeding a current through the thin film coils 43 and 45 of the recording head portion 1B, so as to record information on the recording medium. On the other hand, a change in resistance caused by a signal magnetic field from the recording medium is detected by feeding a sense current through the MR film 20 of the reproducing head portion 1A, so as to read information recorded on the recording medium.

Among the substrate 2D made of a ceramic material, the insulating layer 11 made of $Al_2O_3$ (alumina), and the bottom shield layer 12 and the top shield layer 15 and the like made of a magnetic material such as NiFe (an alloy of nickel and iron: permalloy), each material differs in hardness. Consequently, when the air bearing surface of the magnetic head slider 2 having an above-described structure is formed through polishing, a by-processed step L is, as shown in FIG. 3, produced on an element-multilayerd end face (i.e., the air bearing surface) of the magnetic head slider 2. To cope with this, such measures as described hereinafter are taken in the method of polishing the magnetic head slider according to the embodiment, and accordingly the by-processed step L can be effectively reduced.

[Polishing Apparatus]

Next, a polishing apparatus that is used in the method of polishing the magnetic head slider according to the embodiment will be described.

Figure 4:
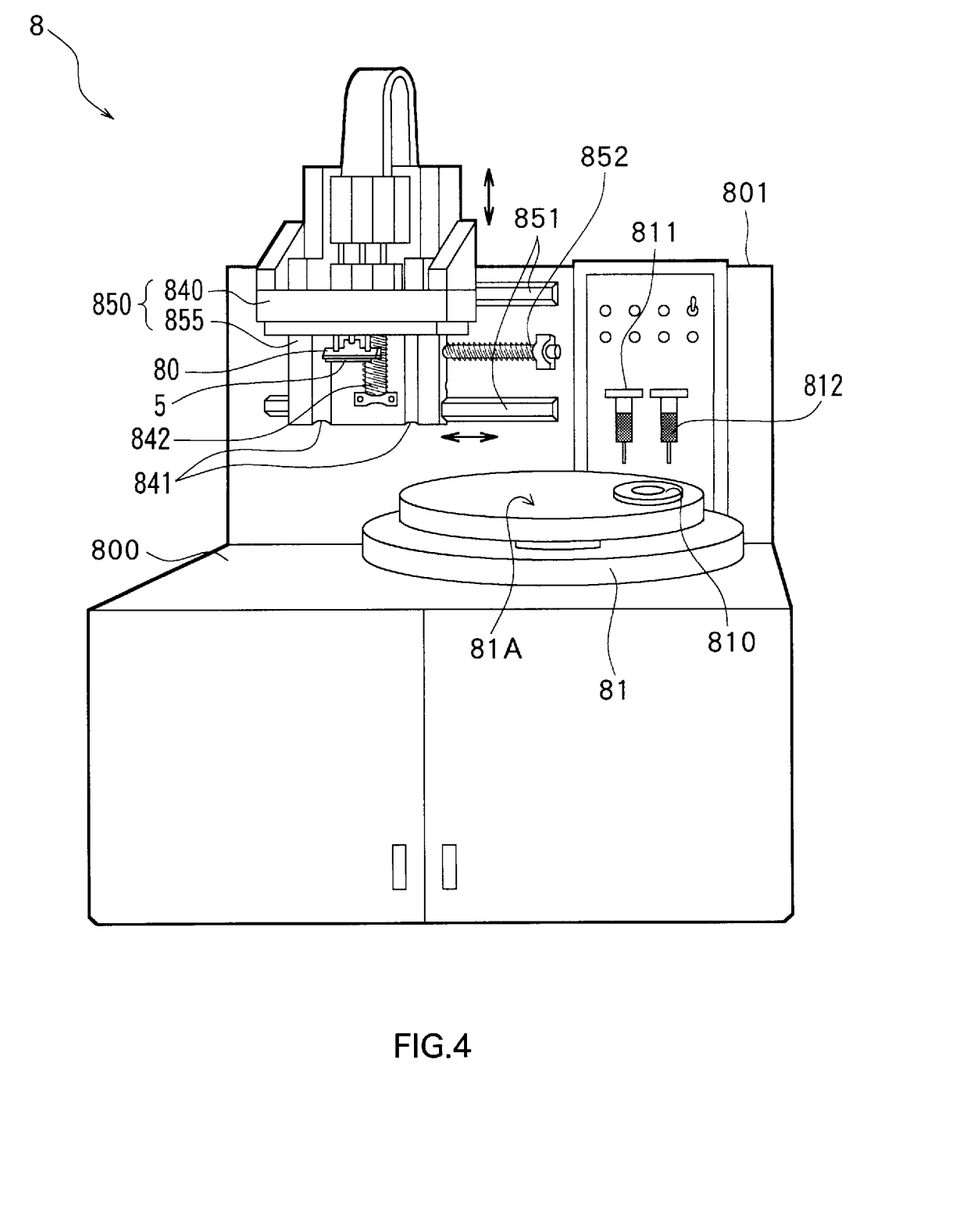
FIG. 4 is a perspective view showing an example of an apparent structure of a polishing apparatus used in the method of polishing a magnetic head slider according to the embodiment of the present invention.

FIG. 4 is a diagram showing an external view of an polishing apparatus 8 for polishing the air bearing surface 2E (FIG. 1) of the magnetic head slider. The polishing apparatus 8 is equipped with a holder 80 and a polishing plate 81. The holder 80 is a long length of a member which holds a bar 5 including a plurality of magnetic head sliders 2 (FIG. 1) where at least one of the thin film magnetic head element 1 (FIG. 1) is formed. The polishing plate 81, which rotates freely, is formed with diamond abrasive or the like being embedded on a polishing surface 81A which is a top surface of a circular plate made of tin (Sn) or the like. The bar 5 is bonded to be fixed on the holder 80 by an adhesive or the like.

Moreover, on the polishing plate 81, a cleaning ring 810 made of a structural material such as $Al_2O_3$ or the like is provided so as to be able to rotate by itself. In this case, the cleaning ring 810 corresponds to "the member for removing the impurities" in the invention.

Over the cleaning ring 810, a lap liquid (hereinbelow, referred to as slurry) 811 with polishing particles and a lap liquid (hereinbelow, referred to as solvent) 812 without polishing particles are equipped so as to be stored in a tank, which is not shown. The slurry 811 and the solvent 812 drip to be supplied to the polishing surface 81A through the cleaning ring 810.

As the main ingredient of the slurry 811 and the solvent 812, for example, an isoparaffin based hydrocarbon solvent is preferably used, of which the boiling point is, for example, higher than 100° C. and preferably higher than 120° C., and the SP value of solubility parameter is less than 10 and preferably less than 8. On the other hand, as an additive of the slurry 811, for example, a free-abrasive-typed polishing slurry composition of fatty acid/vegetable oil base which includes at least one of natural oil and fat or fatty acid, a free-abrasive-typed polishing slurry composition of fine alcohol base which includes at least one kind of compound having a alcoholic hydroxyl radical in a molecule, and a free-abrasive-typed polishing slurry composition of fatty acid ester base which includes at least one kind of fatty acid ester is preferably used. As an additive of the solvent 812, for example, an additive of acetylene glycol/phosphate base (lapping oil composition for finishing process, which is composed of acetylene glycol compound and phosphate compound), a nonionic surfactant, or an additive of fatty acid/vegetable oil base (lapping oil composition including at least either natural oil and fat or fatty acid) is used. With respect to both of the additive of the slurry 811 and the additive of the solvent 812, the amount of addition is set to be, for example, equal to or larger than 0.01 wt %.

The polishing apparatus 8 has a base 800 in a rectangular solid shape and a side frame 801 which is provided standing on the top of the base 800. On the top of the base 800, the above-described polishing plate 81 is provided so as to be able to rotate. On the side frame 801, a sliding body 850 that can transfer along the polishing surface 81A of the polishing plate 81 is supported. The sliding body 850 is held to be able to slide by a guide of a couple of parallel rails 851 formed on the side frame 801. A feeding screw 852 is provided between the two rails 851, and the feeding screw 852 is engaged with a female screw (not shown) that is formed in the sliding body 850. A motor for sliding (not shown) that is installed on the side frame 801 drives the feeding screw 852 to rotate, so that the sliding body 850 horizontally transfers along the rails 851. The sliding mechanism, which makes the sliding body 850 transfer horizontally, makes the holder 80 reciprocate in a diameter direction of the polishing surface 81A of the polishing plate 81, so that the bar 5 is made contact equally with the whole of the polishing surface 81A.

The sliding body 850 consists of a sliding base 855 supported by the rails 851 and a hoisting and lowering body 840 held on the sliding base 855 so as to be able to hoist and lower. On the sliding base 855, guide grooves 841 extending in a vertical direction is formed, and a portion to be guided (not shown) which is formed on the hoisting and lowering body 840 is engaged with the guide grooves 841 so as to be able to slide. Moreover, as shown in FIG. 4, on the sliding base 855, a feeding screw 842 is provided so as to extend in parallel to the guide grooves 841, and the feeding screw 842 is engaged with a female screw (not shown) that is formed in the hoisting and lowering body 840. A motor for hoisting and lowering (not shown) that is mounted on the sliding base 855 makes the feeding screw 842 rotate, so that the hoisting and lowering body 840 hoists and lowers along the guide grooves 841. The hoisting and lowering mechanism, which drives the hoisting and lowering body 840 to hoist and lower, makes the bar 5 transfer in the direction so as to be close and apart to/from the polishing plate 81.

The holder 80 is set to perform a reciprocating round motion at a predetermined angle with an almost vertical axis to the polishing surface 81A as a center by a round motion mechanism that is not shown in the figure, performing a reciprocating linear motion in a radial direction of the polishing plate 81. Consequently, an angle which a longitudinal direction of the bar 5 forms with a rotating direction of the polishing surface 81A can be changed continuously. As a result, a scratch (what is called a smear) is prevented to occur along the rotating direction of the polishing plate 81 on the air bearing surface 2E (FIG. 1) of the magnetic head slider 2 in the bar 5.

[Method of Polishing a Magnetic Head Slider]

Next, referring to FIGS. 5 to 9, the method of polishing the magnetic head slider according to the embodiment will be described.

Figure 5:
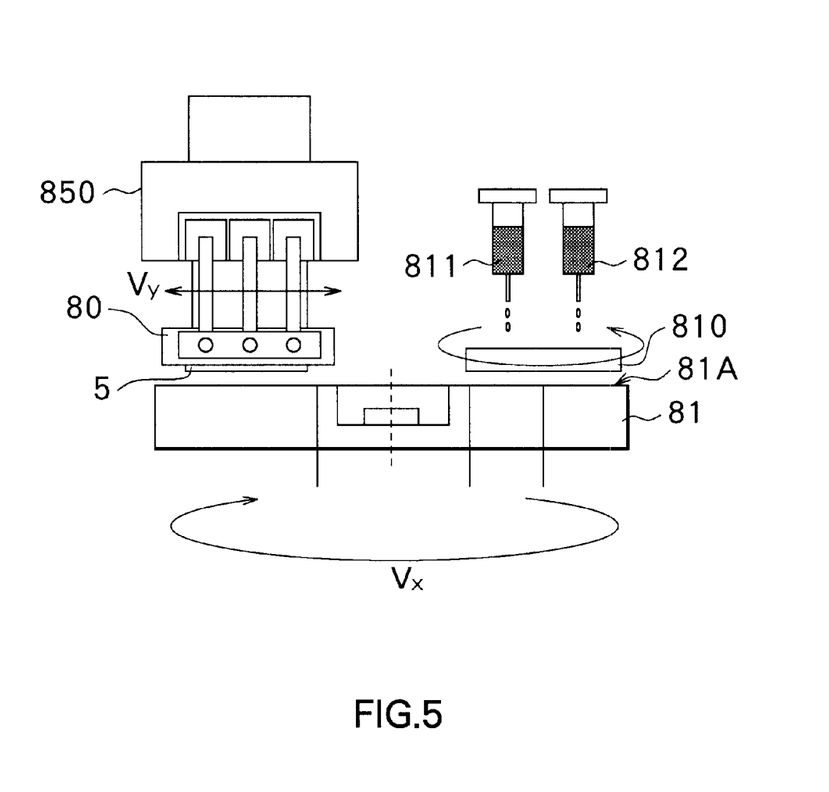
FIG. 5 is an explanatory diagram for illustrating operation of important parts of the polishing apparatus shown in FIG. 4.
Figure 6:
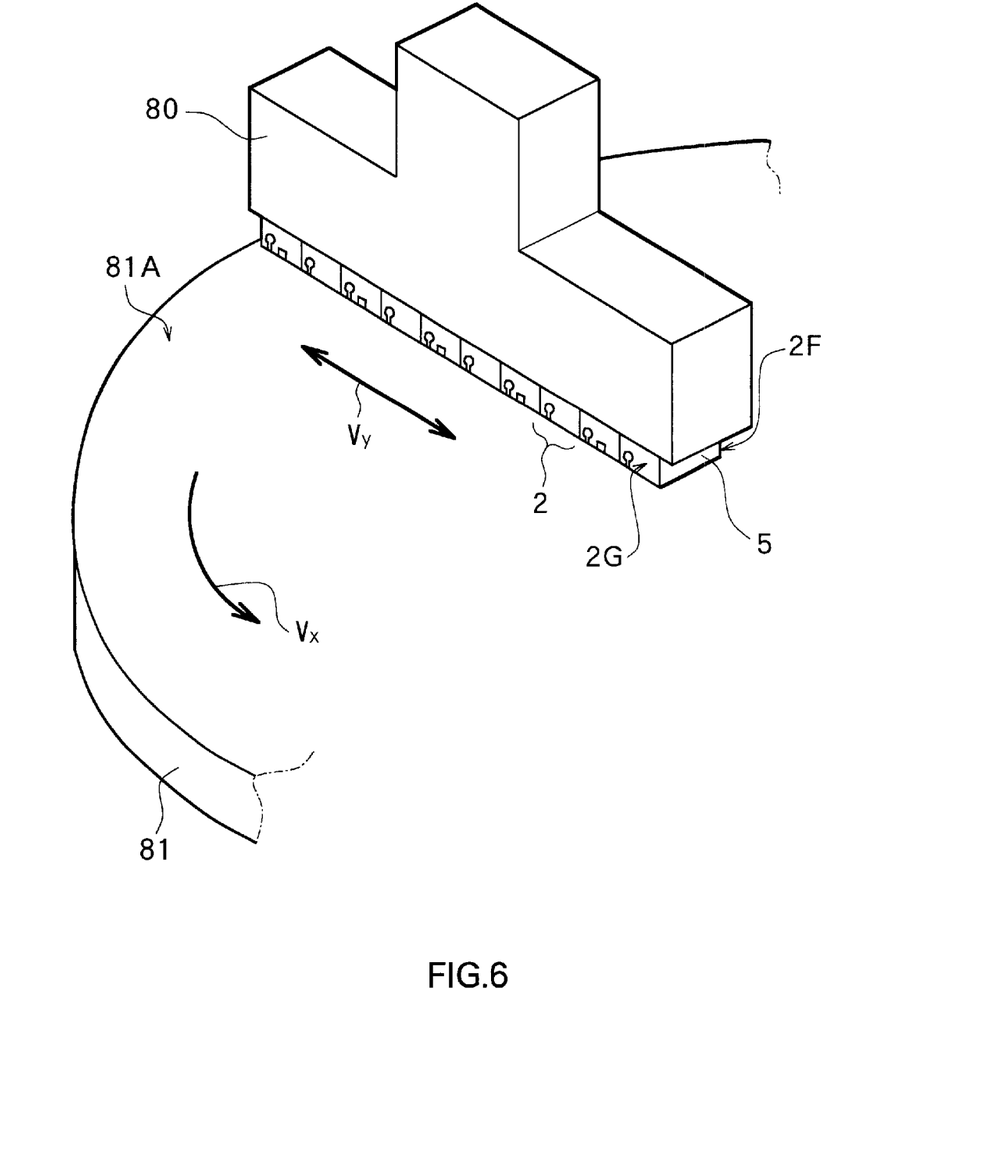
FIG. 6 is a perspective view for illustrating a velocity in the direction of a rotation of a polishing plate and a velocity in the direction of a reciprocating motions of a bar including the magnetic head slider.
Figure 7:
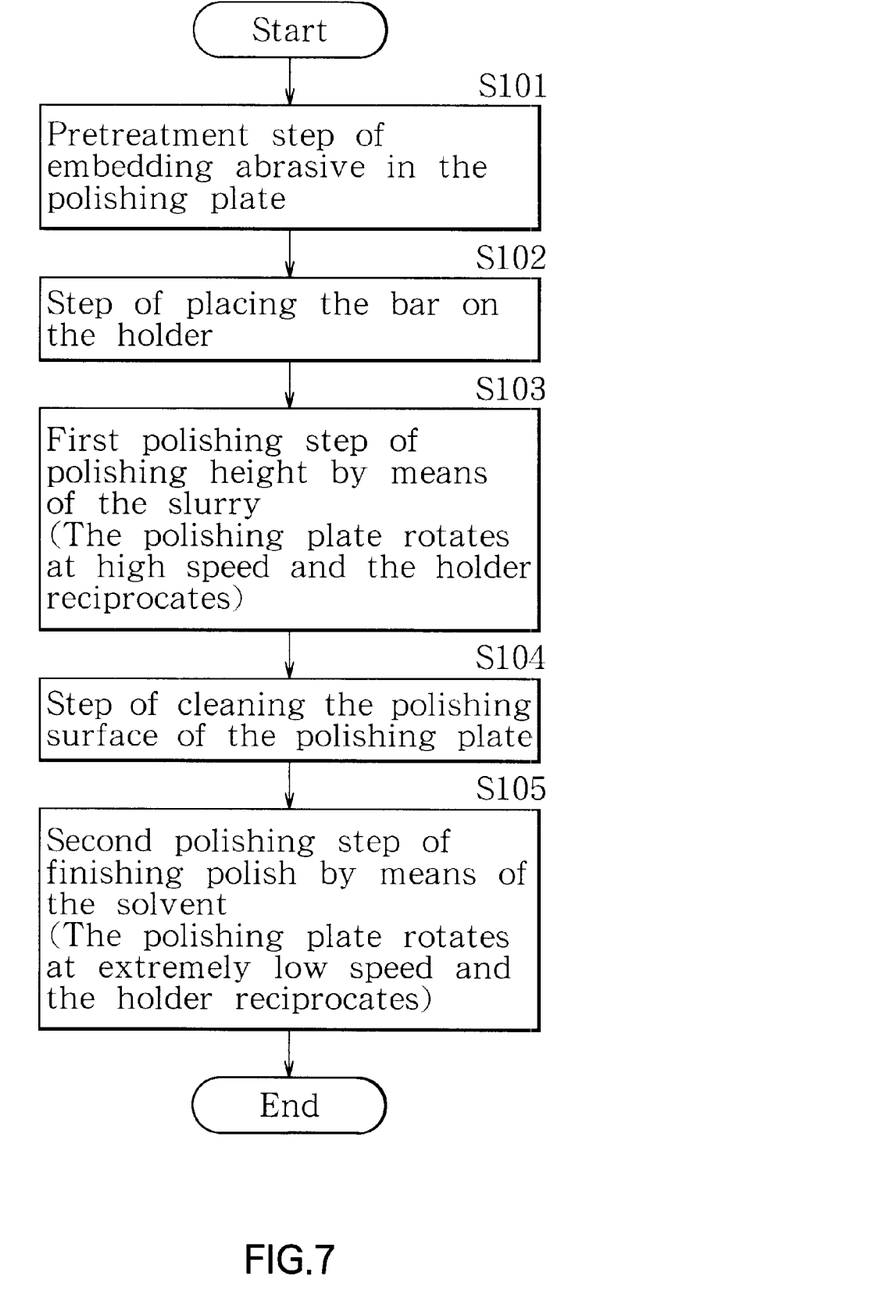
FIG. 7 is an explanatory diagram for illustrating each step in the method of polishing the magnetic head slider according to an embodiment of the present invention.

FIG. 5 is a block diagram of important parts illustrating operation of the polishing apparatus 8 at an occasion of carrying out the method of polishing the magnetic head slider according to the embodiment. FIG. 6 is a perspective view for defining a linear velocity VX in a direction of a rotation of the polishing plate 81 with respect to the bar 5 including the magnetic head slider and a linear velocity VY in a direction of reciprocating motions of the bar 5 with respect to the polishing surface 81A of the polishing plate 81. FIG. 7 is a flowchart for illustrating each step in the method of polishing the magnetic head slider.

First of all, as a pretreatment of polish processing, abrasives for polishing are embedded in the polishing surface 81A of the polishing plate 81 (step S101 in FIG. 7). The treatment of embedding the abrasives are performed as follows. For example, a correcting jig of the polishing surface is provided on the polishing surface 81A of the polishing plate 81. For example, while the slurry including diamond abrasive of which average particle diameter is smaller than ¼ μm is supplied to the polishing surface 81A, the polishing plate 81 is made to rotate for more than 30 minutes at a predetermined speed.

Next, operation of placing the bar 5 on the holder 80 is performed (step S102). The bar 5 includes a plurality of magnetic head sliders 2 (FIG. 1), on each of which at least one of the thin film magnetic head element 1 (FIG. 1) is formed with a thin film forming process. The placing operation is performed under conditions that the sliding body 850 (FIG. 4) is transferred so as to be apart from the polishing plate 81 (for example, left side of the base 800 in FIG. 4) and the hoisting and lowering body 840 (FIG. 4) is, for example, hoisted. An operator fixes an opposite surface of a surface to be the air bearing surface 2E of the bar 5 on the holder 80 by means of an adhesive, for example, using specifically designed tools and jigs. Incidentally, although a single piece of bar 5 is fixed on the holder 80 in the embodiment, more than two pieces of bar 5 may be fixed so as to be parallel to each other.

With regard to the direction of placing the bar 5 on the holder 80, for example, it is preferable to be placed as shown in FIG. 6. That is, the polishing plate 81 is set to rotate in a direction to proceed from the opposite surface 2F to the element forming surface 2G on the magnetic head slider 2 to the element forming surface 2G side. More specifically, the polishing plate 81 is set to transfer in a direction Z in FIG. 3. This is because it is conceivable to be able to effectively avoid a situation that the by-processed step L further expands due to an accumulation of impurities such as the polishing abrasive floating over the polishing surface 81A and the polish leavings produced by polishing in the slightly by-processed step L between the substrate 2D and the thin film magnetic head element portion 1, as shown in FIG. 3.

After the bar 5 is placed on the holder 80, the sliding body 850 (FIG. 4) is made to slide so as to transfer the holder 80 to a position above the polishing plate 81. Next, the hoisting and lowering body 840 (FIG. 4) is made to lower so that the bar 5 held on the holder 80 is in touch with the polishing surface 81A of the polishing plate 81.

Subsequently, a first polishing step (also referred to as a step of polishing height by means of the slurry) is performed (step S103). First, the bar 5 is pressed on the polishing plate 81, for example, by a load of about 3 kgf, and then the lap liquid (slurry) 811 with the polishing particles is supplied drop by drop at a position of the cleaning ring 810 on the polishing surface 81A, while the rotating motion of the polishing plate 81 and the self-rotating motion of the cleaning ring 810 are made to start. Thereby, the operation of polishing the height of the air bearing surface 2E (FIG. 1) of the magnetic head slider 2 (FIG. 1) in the bar 5 starts.

On the other hand, at the almost same time when the polishing plate 81 starts rotating, the sliding body 850 (FIG. 4) is made to start reciprocating motions within a predetermined range of motion. By virtue of the reciprocating motions, the bar 5 reciprocates between the outer regions and the inner regions along the radius direction of the polishing surface 81A of the polishing plate 81, thereby being evenly in touch with the whole of the polishing surface 81A.

Additionally, at the almost same time when the polishing plate 81 starts rotating and the bar 5 starts the reciprocating motions, a turning body (not shown) that holds the holder 80 is made to start a to-and-fro turning motion at a predetermined angle. The turning motion of the holder 80, as described above, makes an angle formed by the rotation direction of the polishing plate 81 with the longitudinal direction of the bar 5 change. Consequently, it is prevented that the scratch, which is called the smear, extending in a certain direction on the bar 5 is produced. The first polishing step is performed, for example, under the conditions shown in FIG. 8 that will be described hereinafter, for example, for about 2 minutes.

Figure 8:
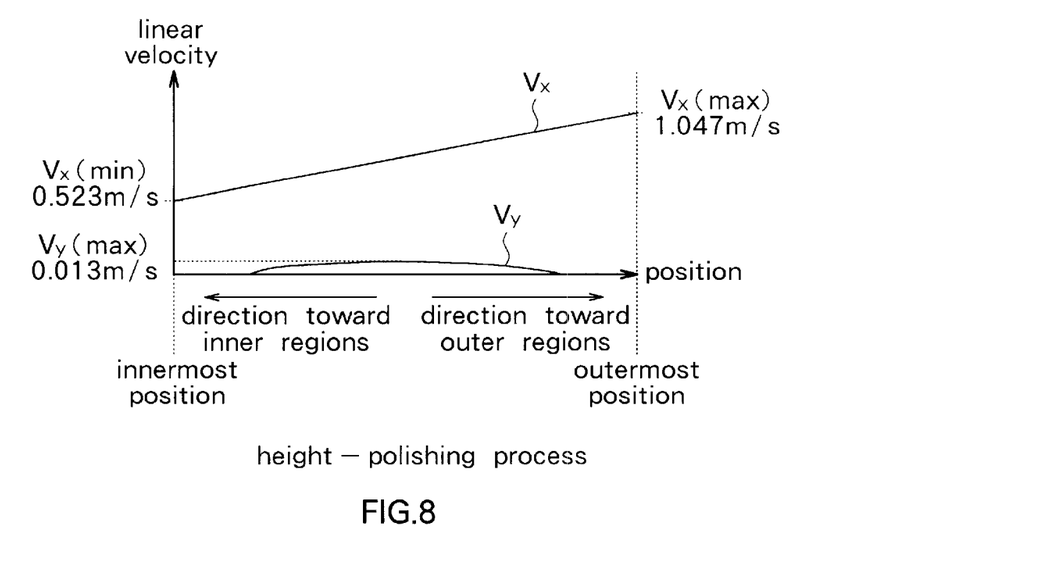
FIG. 8 is a diagram showing a relation between a position in the direction of the radius of a polishing surface in a first polishing step and each velocity in the direction of the rotation of the polishing plate and in the direction of the reciprocating motions of the bar.

FIG. 8 shows an example of a profile of the polishing conditions at the first polishing step. In this diagram, a lateral axis indicates a position of the bar 5 along the radius direction of the polishing surface 81A, and a vertical axis indicates the linear velocity VX in the direction of the rotation of the polishing plate 81 with respect to the bar 5 and the velocity VY in the direction of the reciprocating motions of the bar 5 with respect to the polishing surface 81A of the polishing plate 81.

The example shown in FIG. 8 is in a case where the number of revolutions of the polishing plate 81 is set to be 50 rpm. The linear velocity VX in the direction of the rotation of the polishing plate 81 with respect to the bar 5 indicates the minimum value VX (min.)=0.523 m/s at the innermost position, and indicates the maximum value VX (max.)=1.047 m/s at the outermost position. In this case, the average linear velocity VX1 (av.) in the direction of the rotation is 0.785 m/s. The velocity VY in the direction of the reciprocating motions of the bar 5 along the radius direction of the polishing surface 81A indicates the minimum value VY (min.)=0 m/s at the both ends of a path of the reciprocating motions, and indicates the maximum value VY (max.)=0.013 m/s at the center of the path of the reciprocating motions.

However, the average linear velocity VX1 (av.) in the direction of the rotation at the first polishing step is not limited to the above-indicated value (0.785 m/s). The value can be changed, for example, within the range of 0.157 to 1.570 m/s (10 to 100 rpm), more preferably, for example, within the range of 0.471 to 1.099 m/s (30 to 70 rpm). The maximum value VY (max.) of the velocity VY in the direction of the reciprocating motions of the bar 5 is not also limited to the above-indicated value (0.013 m/s). The value can be changed, for example, within the range of 0.010 to 0.015 m/s (about ±20% of 0.013 m/s), more preferably, for example, within the range of 0.012 to 0.014 m/s (about ±10% of 0.013 m/s).

After the completion of the height-polishing process, the hoisting and lowering body 840 (FIG. 4) and the sliding body 850 (FIG. 4) are driven so that the bar 5 held on the holder 80 is made to be apart from the polishing plate 81 and in the standby position.

Next, a step of cleaning the polishing surface 81A of the polishing plate 81 is performed (step S104). The cleaning step is performed as follows. The polishing surface 81A is wiped by means of an organic solvent composed of acetone or the like, or the polishing plate 81 and the cleaning ring 810 is rotated with the solvent 812 dripped so as to be supplied on the polishing surface 81A. As a result, the impurities such as the polishing particles floating over the polishing surface 81A and the polish leavings can be reduced.

After the completion of the cleaning step, the hoisting and lowering body 840 (FIG. 4) is lowered by dint of the hoisting and lowering body 840 (FIG. 4) and the sliding body 850 (FIG. 4) so that the bar 5 held on the holder 80 is in touch with the polishing surface 81A of the polishing plate 81. In such a state, a second polishing step (finishing polish process) is performed (step S105).

At the second polishing step, while the bar 5 is pressed on the polishing plate 81, for example, by a load of about 3 kgf and the lap liquid (solvent) 812 without the polishing particles is supplied drop by drop on the polishing surface 81A through the rotating cleaning ring 810, the polishing plate 81 starts the rotation. Thereby, the operation of finishing polish of the air bearing surface 2E (FIG. 1) of the magnetic head slider 2 (FIG. 1) in the bar 5 starts. At this step, as will be described below, the linear velocity VX in the direction of the rotation of the polishing plate 81 is reduced to a sufficiently low speed when compared with the case of the height-polishing process at the first step.

On the other hand, at the almost same time when the polishing plate 81 starts rotating, the sliding body 850 (FIG. 4) starts the reciprocating motions within a predetermined range of motion. By virtue of the reciprocating motions, the bar 5 reciprocates between the outer regions and the inner regions along the radius direction of the polishing surface 81A of the polishing plate 81. Incidentally, the holder 80 is made to turn to-and-fro within a range of a predetermined angle in a manner similar to the case of the first polishing step. The second polishing step is performed, for example, under the conditions shown in FIG. 9 that will be described hereinafter, for example, for about 3 minutes.

Figure 9:
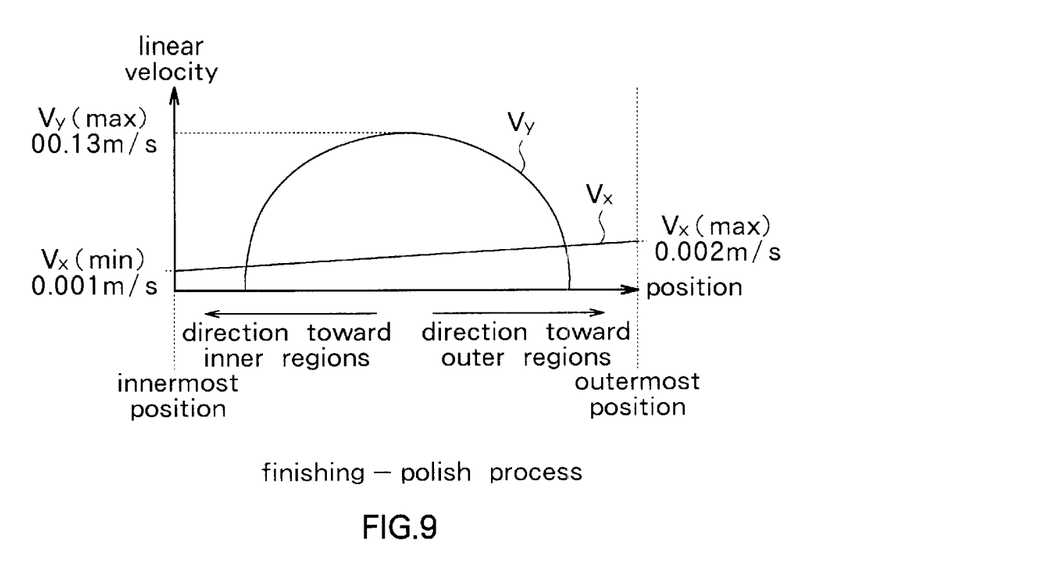
FIG. 9 is a diagram showing a relation between a position in the direction of the radius of a polishing surface in a second polishing step and each velocity in the direction of the rotation of the polishing plate and in the direction of the reciprocating motions of the bar.

FIG. 9 shows an example of a profile of the polishing conditions at the second polishing step. In this diagram, a lateral axis indicates a position of the bar 5 along the radius direction of the polishing surface 81A, and a vertical axis indicates the linear velocity VX in the direction of the rotation of the polishing plate 81 with respect to the bar 5 and the velocity VY in the direction of the reciprocating motions of the bar 5 with respect to the polishing surface 81A of the polishing plate 81.

Figure 10:
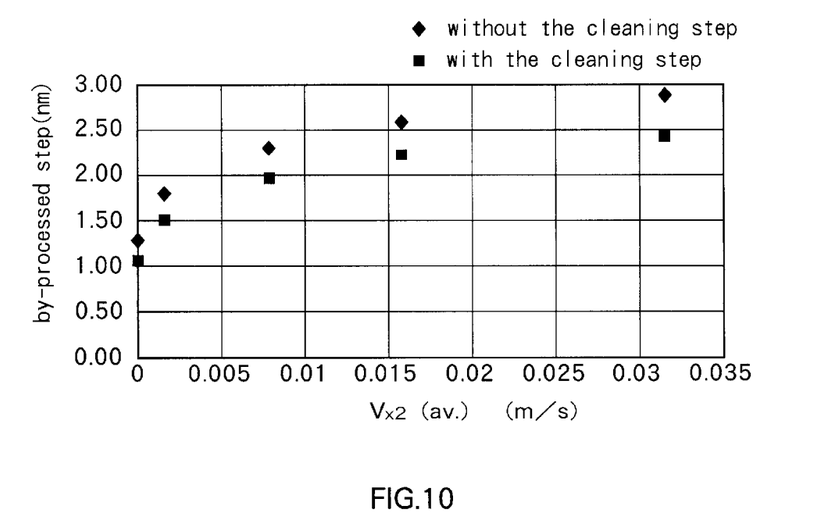
FIG. 10 is a diagram showing a relation between an average linear velocity in the direction of the rotation of the polishing plate and a by-processed step on an air bearing surface.

At this step, the number of revolutions of the polishing plate 81 is, for example, set to be the extremely low number of revolutions such as 0.1 rpm. In this case, as shown in FIG. 10, the minimum value VX (min.) of the linear velocity in the direction of the rotation indicates 0.001 m/s, and the maximum value VX (max.) of the linear velocity in the direction of the rotation indicates 0.002 m/s. The average linear velocity VX2 (av.) in the direction of the rotation is 0.0015 m/s. With regard to the velocity VY in the direction of the reciprocating motions of the bar 5, it is preferable to be set at the same speed as in the case of the height-polishing process at the first step, that is, at the speed of the maximum value VY (max.) 0.013 m/s.

However, the average linear velocity VX2 (av.) in the direction of the rotation at the second polishing step is not limited to the above-indicated value (0.0015 m/s). The value can be changed, for example, within the range of 0.00016 to 0.03142 m/s (0.01 to 2.00 rpm), more preferably, within the range of 0.00016 to 0.00785 m/s (0.01 to 0.50 rpm). The maximum value VY (max.) of the velocity in the direction of the reciprocating motions of the bar 5 can be changed, for example, within the range of 0.010 to 0.015 m/s.

FIG. 10 shows an effect which the average linear velocity in the direction of the rotation of the polishing plate 81 at the second polishing step has on the by-processed step L on the air bearing surface 2E. In this diagram, a lateral axis indicates the average linear velocity VX2 (av.) [unit: m/s] in the direction of the rotation of the polishing plate 81 and a vertical axis indicates the by-processed step L [unit: nm]. The symbol '♦' stands for data in the case where the cleaning step is not performed, and the symbol '■' stands for data in the case where the cleaning step is performed.

To begin with, the case where the cleaning step is not performed will be considered. In the related art, a polishing step is not divided into a first polishing step of polish at a higher polishing speed and a second polishing step of polish at an extremely low speed, so as to be performed at a constant speed (for example, 0.785 m/s) of the rotation through the whole of the polishing step. For example, the by-processed step L of the air bearing surface 2E is about 5 nm in the case of the above related art. Contrastively, as in the embodiment, the by-processed step L is, as shown in FIG. 10, about 2.9 nm in the case where the average linear velocity VX2 (av.) in the direction of the rotation at the second polishing step is set to be the extremely low speed of, for example, 0.032 m/s. As compared with the case of the related art, the by-processed step L is reduced by about 40%. In addition, in the case where the average linear velocity VX2 (av.) in the direction of the rotation at the second polishing step is set to be 0.008 m/s, the by-processed step L (=about 2.3 nm) is reduced by about 20%, when compared with the by-processed step L (=about 2.9 nm) in the case where the velocity VX2 (av.) is set to be 0.032 m/s.

Next, the case where the cleaning step is performed before starting the second polishing step will be considered. When the cleaning step is performed, as shown in FIG. 10, the by-processed step L is further reduced. In this case, for example, the by-processed step L is about 2.5 nm in the case where the average linear velocity VX2 (av.) in the direction of the rotation at the second polishing step is set to be 0.032 m/s. As compared with the by-processed step L (=about 2.9 nm) in the case where the cleaning step is not performed, the by-processed step L is reduced by about 14%. Moreover, the by-processed step L is about 2.0 nm in the case where the average linear velocity VX2 (av.) in the direction of the rotation is set to be 0.008 m/s, and is reduced by about 13% when compared with the by-processed step L (=about 2.3 nm) in the case where the cleaning step is not performed.

Considering the cases mentioned above, it can be understood that the lower the average linear velocity VX2 (av.) in the direction of the rotation of the polishing plate 81 is, the smaller the by-processed step L becomes, whether the cleaning step is performed or not. For example, it is preferable that the average linear velocity VX2 (av.) in the direction of the rotation at the second step of the finishing polish process is set to be equal to or lower than 0.032 m/s, more preferably, equal to or lower than 0.008 m/s. Practically, it is preferable that the number of the revolutions of the polishing plate 81 at the first polishing step is set to be 50 rpm and the number of the revolutions at the second polishing step is set to be 0.01 to 2 rpm. For reference sake, the reason why the by-processed step L becomes smaller as the average linear velocity VX2 (av.) in the direction of the rotation of the polishing plate 81 is lower can be supposed as follows. Namely, that is because the load that the polishing particles impose upon the object to be polished (bar 5) can be dispersed as much as the relative linear velocity of the polishing plate 81 to the object to be polished (bar 5) is lower.

Furthermore, as is evident from FIG. 10, it can be seen that performing the cleaning step before starting the second polishing step makes the by-processed step L further reduced. That can be supposed because the impurities on the polishing surface 81A is reduced by the cleaning step. As a result, it can be avoided that the accumulation of the above impurities in the slightly by-processed step L which is generated between the substrate 2D and the thin film magnetic head element portion 1 at the first polishing step causes the amount of the step to further enlarge.

Incidentally, as a cleaning method, as described above, the method of wiping the polishing surface 81A of the polishing plate 81 by means of an organic solvent or the method of rotating the polishing plate 81 and the cleaning ring 810 with the solvent including no abrasive supplied on the polishing surface 81A of the polishing plate 81 is preferable. However, the other methods are acceptable. Needless to say, the cleaning step can be omitted, because the by-processed step L is certainly reduced even in the case where the cleaning step is not performed.

Figure 11:
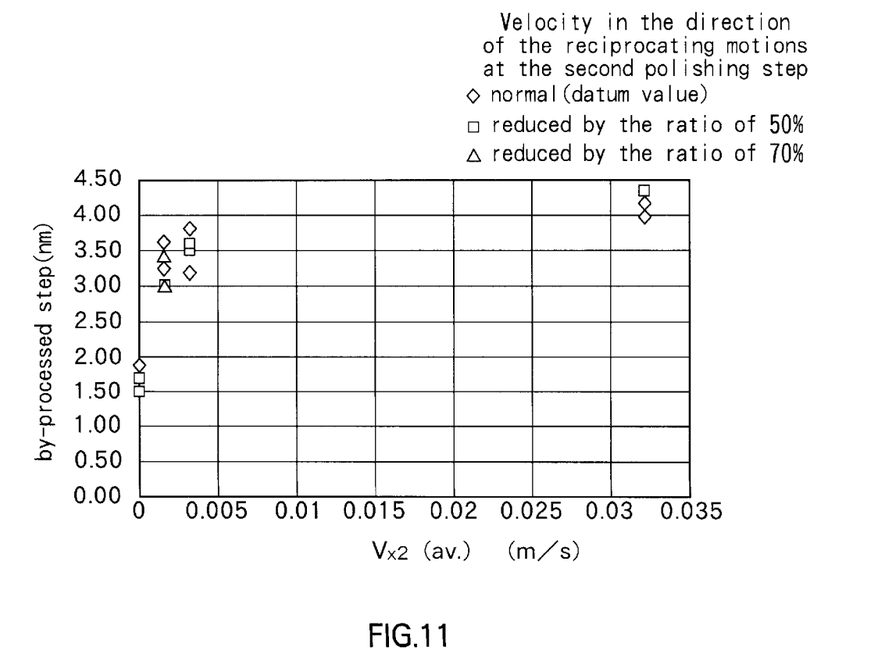
FIG. 11 is a diagram showing an effect that the velocity in the direction of the reciprocating motions of the bar has on the by-processed step.

FIG. 11 shows an effect that the reciprocating velocity of the bar 5 along the radius direction of the polishing plate 81 has on the by-processed step L at the second polishing step. In this diagram, a lateral axis indicates the average linear velocity VX2 (av.) [unit: m/s] in the direction of the rotation of the polishing plate 81 at the second polishing step and a vertical axis indicates the by-processed step L [unit: nm]. The symbol '◇' stands for data in the case where the maximum value VY (max.) of the reciprocating velocity of the bar 5 in the radius direction of the polishing plate 81 is a datum value (0.013 m/s) shown in FIG. 9. The symbol '□' stands for data in the case where the maximum value VY (max.) of the reciprocating velocity of the bar 5 is 50% of the above datum value. The symbol 'Δ' stands for data in the case where the maximum value VY (max.) of the reciprocating velocity of the bar 5 is 70% of the above datum value.

As is evident from FIG. 11, it is understood that there is not discernible a significant difference, as far as the size of the by-processed step L is concerned, even if the maximum value VY (max.) of the velocity in the direction of the reciprocating motions of the bar 5 is reduced by the ratio of 50%, and even if reduced by the ratio of 70%.

As explained above, according to the embodiment, the second polishing step of performing the finishing polish of the air bearing surface 2E (FIG. 1) is performed with the linear velocity VX in the direction of the rotation of the polishing plate 81 reduced to the extremely low speed. As a result, the by-processed step L that is generated on the element-multilayered end face (air bearing surface) of the magnetic head slider 2 can be easily reduced.

Furthermore, according to the embodiment, before starting the second polishing step, the cleaning step is set to be performed on the polishing surface 81A of the polishing plate 81. Consequently, the floating impurities such as the polishing particles, the polish leavings and the like can be reduced, so that the effect of the impurities having on the finishing polish can be reduced. As a result, the by-processed step L that is generated on the element-multilayered end face of the magnetic head slider 2 can be further reduced, and the accuracy in the polishing can be improved.

[Variation]

In the above embodiment, the polishing plate 81 is set to rotate at the extremely low speed at the second polishing step. However, the present invention is not limited to the above description. With the polishing plate 81 set to be entirely stopped at the second polishing step, the finishing polish process can be performed only by reciprocating the bar 5 along the radius direction of the polishing surface 81A of the polishing plate 81. In this case, the other profile of the polishing conditions (the velocity VY in the direction of the reciprocating motions of the bar 5, the load on the bar 5, the time of the polishing process and the like) at the second polishing step is similar to the case of the above embodiment.

In the present variation, the rotation of the polishing plate 81 is set to be stopped (the average linear velocity VX2 (av.) in the direction of the rotation=0 m/s) at the second polishing step. As a result, as shown in FIGS. 10 and 11, the by-processed step L can be further reduced. Concretely, the by-processed steps L in the case where the cleaning step is not performed and in the case where the cleaning step is performed are about 1.2 nm and about 1.0 nm, respectively. As compared with the case where the average linear velocity VX2 (av.) in the direction of the rotation is set to be 0.032 m/s, the by-processed step L is reduced to be smaller than 50%.

Thus, the by-processed step L is remarkably reduced, when the polishing plate 81 is not rotated at the second polishing step and the finishing polish is performed only by the reciprocating motions of the bar 5. The reason can be supposed to be as similar to that of the case where the polishing plate 81 is set to rotate at the extremely low speed. Namely, that is because the load that the polishing particles impose upon the object to be polished (bar 5) can be dispersed as much as the relative linear velocity of the polishing plate 81 to the object to be polished (bar 5) is lower.

Although, up to this point, the present invention is illustrated by giving embodiments, the invention is not limited to these embodiments and many variations are possible. For example, the bar 5 is set to be once apart from the polishing plate 81 between the first polishing step and the cleaning step in the above embodiment. However, the cleaning step may be set to follow as it is, without setting the bar 5 apart from the polishing plate 81, after the first polishing step is completed. Otherwise, it is possible to immediately shift to the second polishing step, without performing the cleaning step, after the first polishing step is completed.

Furthermore, the thin film magnetic head element 1 is not limited to that with the AMR film or the GMR film, and may be that with other MR film such as TMR (Tunnel-type Magneto-Resistive) film. Furthermore, the object to which the invention is applied is not limited to the magnetic head slider where the composite thin film magnetic head having the recording head and the reproducing head is formed. For example, it is applicable to the magnetic head slider where either reproduce-only head or record-only head is solely formed.

As explained above, according to the method of polishing the magnetic head slider of the first aspect of the invention, the second polishing step of performing the finishing polish process of the air bearing surface is set to be performed with the average linear velocity in the direction of the rotation of the polishing plate set to be sufficiently equal to or lower than that of the first polishing step. Consequently, the size of the by-processed step that is generated on the element-multilayered end face of the magnetic head slider can be effectively reduced, by extremely easy means.

Furthermore, according to the method of polishing the magnetic head slider of the second aspect of the invention, following the first polishing step, the second polishing step of polishing to finish the air bearing surface is set to be performed by the reciprocating motions of the magnetic head slider without the polishing plate set to rotate. Consequently, the size of the by-processed step that is generated on the element-multilayered end face of the magnetic head slider can be further reduced.

Furthermore, according to the method of polishing the magnetic head slider of the third aspect of the invention, in addition to the above steps, the cleaning step is further performed between the first polishing step and the second polishing step. Consequently, an effect on the finishing polish, which is caused by the impurities such as the polishing particles, the polish leavings and the like that are floating over the polishing plate, can be reduced. Accordingly, the size of the by-processed step that is generated on the element-multilayered end face of the magnetic head slider can be even further reduced.

Among the above cases, especially in the case where the polish is performed with one and the same polishing apparatus, the polishing process of the magnetic head slider can be performed at low cost, as well as without requiring a large space for placing the apparatus.

Obviously many modifications and variations of the present invention are possible in the light of the above teachings. It is therefore to be understood that within the scope of the appended claims the invention may be practiced otherwise than as specifically described.

What is claimed is:

1. A method of polishing a magnetic head slider, whereby an element-multilayered end face of the magnetic head slider where a thin film magnetic head element is formed as a multilayered structure is polished with a polishing plate having a polishing surface, including:

a first polishing step of polishing the element-multilayered end face of the magnetic head slider by means of setting the polishing plate to rotate at a first velocity; and a second polishing step of performing a finishing polish of the element-multilayered end face of the magnetic head slider processed in the first polishing step by means of setting the polishing plate to rotate at a second velocity lower than the first velocity, wherein the second velocity is set so that an average linear velocity in a direction of the rotation of the polishing plate is equal to or lower than 0.032 meters per second in the second polishing step.

2. A method of polishing a magnetic head slider according to claim 1, wherein the second velocity is set so that the average linear velocity in the direction of the rotation of the polishing plate is equal to or lower than 0.008 meters per second in the second polishing step.

3. A method of polishing a magnetic head slider according to claim 1, wherein the magnetic head slider is set to reciprocate along a direction almost orthogonal to the direction of the rotation of the polishing plate in the second polishing step.

4. A method of polishing a magnetic head slider according to claim 1, wherein the second polishing step is performed with a polishing liquid that includes no polishing abrasives.

5. A method of polishing a magnetic head slider according to claim 1, wherein the first polishing step is performed with a polishing liquid that includes polishing abrasives.

6. A method of polishing a magnetic head slider according to claim 1, wherein a cleaning step for removing impurities generated in the first polishing step is performed before starting the second polishing step.

7. A method of polishing a magnetic head slider according to claim 6, wherein the impurities are removed by means of wiping off the impurities on the polishing plate with a predetermined solvent in the cleaning step.

8. A method of polishing a magnetic head slider according to claim 6, wherein the impurities on the polishing plate are removed using a member for removing the impurities that is provided on the polishing surface of the polishing plate while the polishing plate is rotated with a predetermined solvent being supplied in the cleaning step.

9. A method of polishing a magnetic head slider according to claim 8, wherein the first polishing step, the cleaning step and the second polishing step are continuously performed with one and the same polishing apparatus.

10. A method of polishing a magnetic head slider according to claim 6, wherein the first polishing step, the cleaning step and the second polishing step are continuously performed with one and the same polishing apparatus.

11. A method of polishing a magnetic head slider according to claim 1, wherein the first polishing step and the second polishing step are continuously performed with one and the same polishing apparatus.

12. A method of polishing a magnetic head slider, whereby an element-multilayered end face of the magnetic head slider where a thin film magnetic head element is formed as a multilayered structure is polished with a polishing plate having a polishing surface, including:

a first polishing step of polishing the element-multilayered end face of the magnetic head slider by means of setting the polishing plate to rotate at a first velocity; and a second polishing step of performing a finishing polish of the element-multilayered end face of the magnetic head slider processed in the first polishing step by means of setting the magnetic head slider to reciprocate along a direction almost orthogonal to the direction of the rotation of the polishing plate in the first polishing step with the polishing plate set to stop; and a cleaning step for removing impurities that are generated in the first polishing step that is performed before starting the second polishing step, wherein, the impurities on the polishing plate are removed using a member for removing the impurities that is provided on the polishing surface of the polishing plate while the polishing plate is rotated with a predetermined solvent being supplied in the cleaning step.

13. A method of polishing a magnetic head slider according to claim 12, wherein the second polishing step is performed with a polishing liquid that includes no polishing abrasives.

14. A method of polishing a magnetic head slider according to claim 12, wherein the first polishing step is performed with a polishing liquid that includes polishing abrasives.

15. A method of polishing a magnetic head slider according to claim 12, wherein the first polishing step and the second polishing step are continuously performed with one and the same polishing apparatus.

16. A method of polishing a magnetic head slider according to claim 12, wherein the first polishing step, the cleaning step and the second polishing step are continuously performed with one and the same polishing apparatus.

* * * * *

UNITED STATES PATENT AND TRADEMARK OFFICE
CERTIFICATE OF CORRECTION

PATENT NO.     : 6,497,611 B2                                                                Page 1 of 1
DATED          : December 24, 2002
INVENTOR(S)    : Toshimichi Sakurada et al.

It is certified that error appears in the above-identified patent and that said Letters Patent is hereby corrected as shown below:

<u>Title page,</u>
Item [73], the second Assignee was not listed on the title page. Please add:
-- Tokyo Magnetic Printing Co., Ltd. of Tokyo, Japan. --
Item [75], please replace the 4$^{th}$ inventor's first name from "Kazuo" to -- Kazuya --.

Signed and Sealed this

Fifteenth Day of April, 2003

JAMES E. ROGAN
*Director of the United States Patent and Trademark Office*